Figure 1:
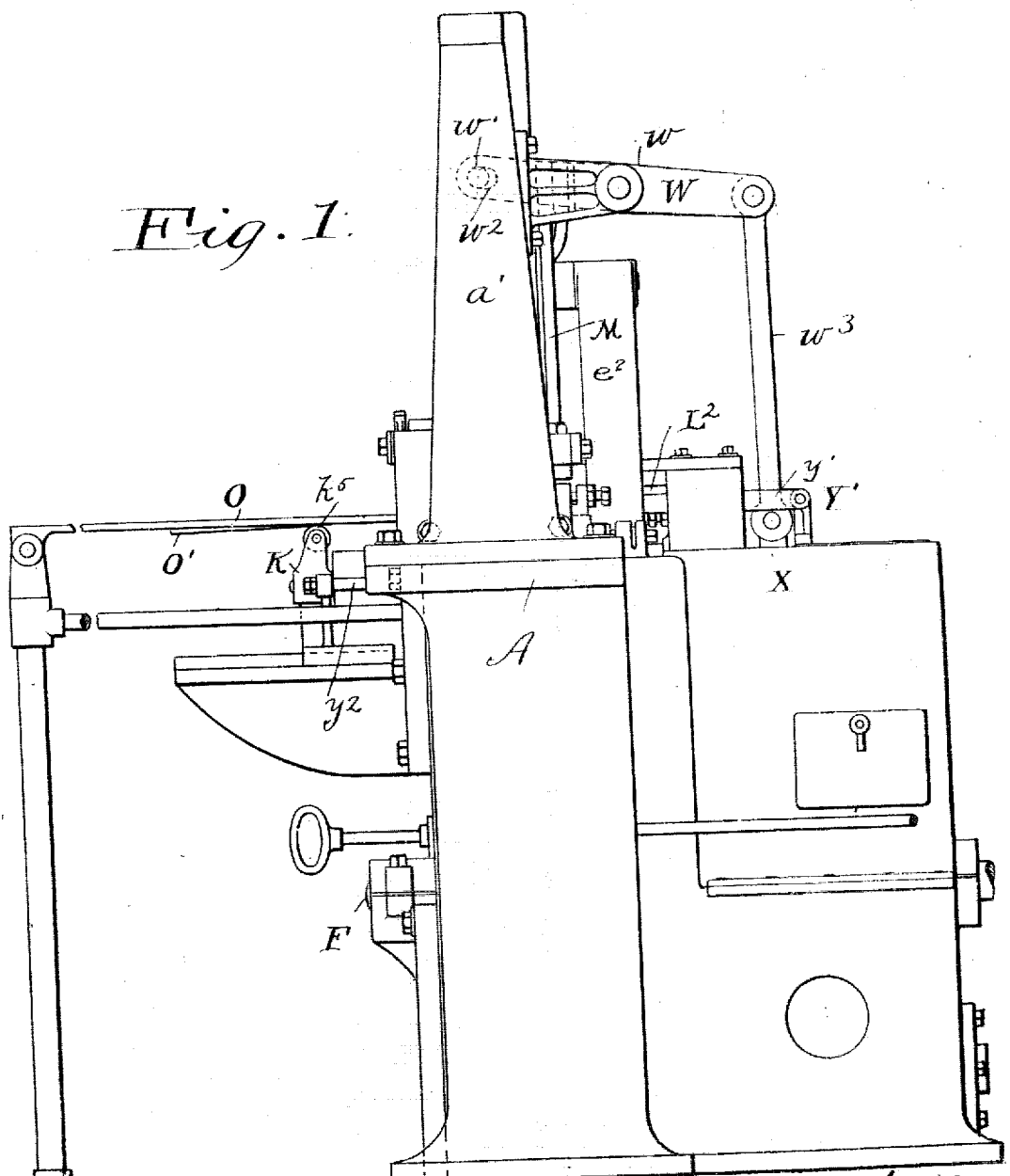

No. 828,723.  
T. J. DUGAN.  
MACHINE FOR MAKING CAN BODIES.  
APPLICATION FILED JUNE 28, 1905.

PATENTED AUG. 14, 1906.

10 SHEETS—SHEET 6.

Fig. 6.

Witnesses.
E. B. Gilchrist
G. M. Myers

Inventor.
Thomas J. Dugan,
By his Attorneys,
Thurston & Bates

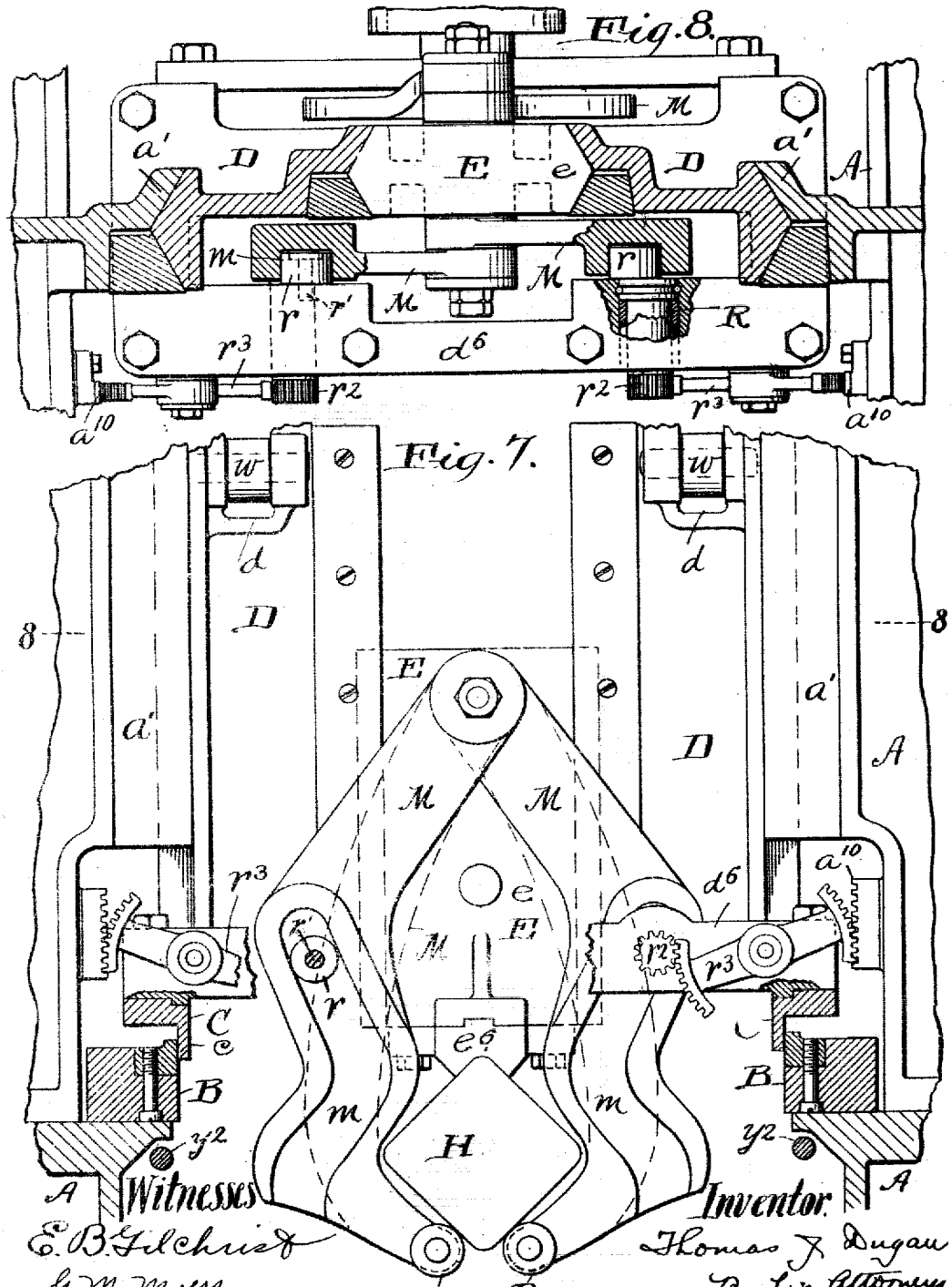

No. 828,723. PATENTED AUG. 14, 1906.
T. J. DUGAN.
MACHINE FOR MAKING CAN BODIES.
APPLICATION FILED JUNE 28, 1905.
10 SHEETS—SHEET 8.

Witnesses.
E. B. Gilchrist
G. M. Myers

Inventor
Thomas J. Dugan
By his Attorney
Thurston & Bates

No. 828,723. PATENTED AUG. 14, 1906.
T. J. DUGAN.
MACHINE FOR MAKING CAN BODIES.
APPLICATION FILED JUNE 26, 1905.
10 SHEETS—SHEET 9.
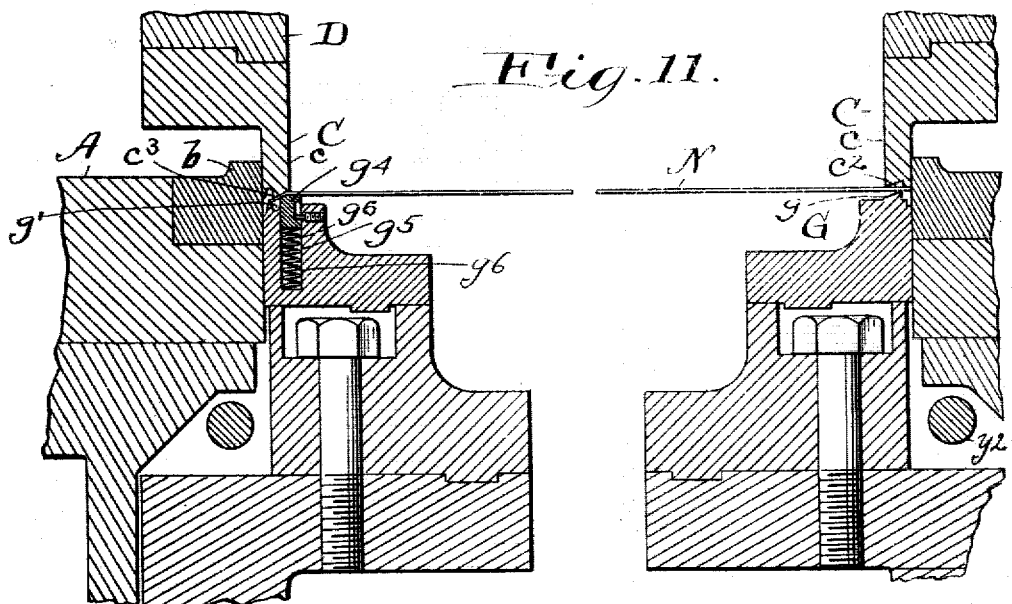
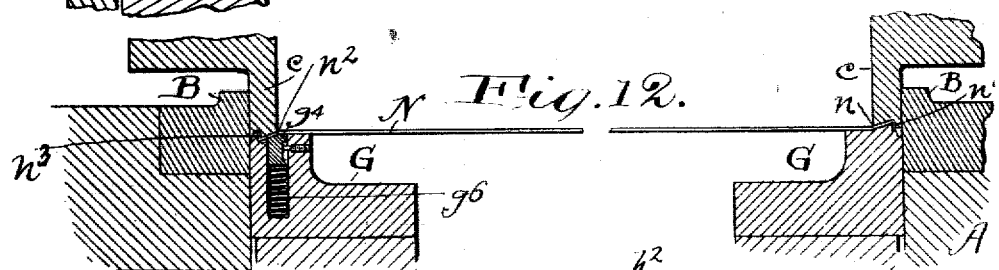
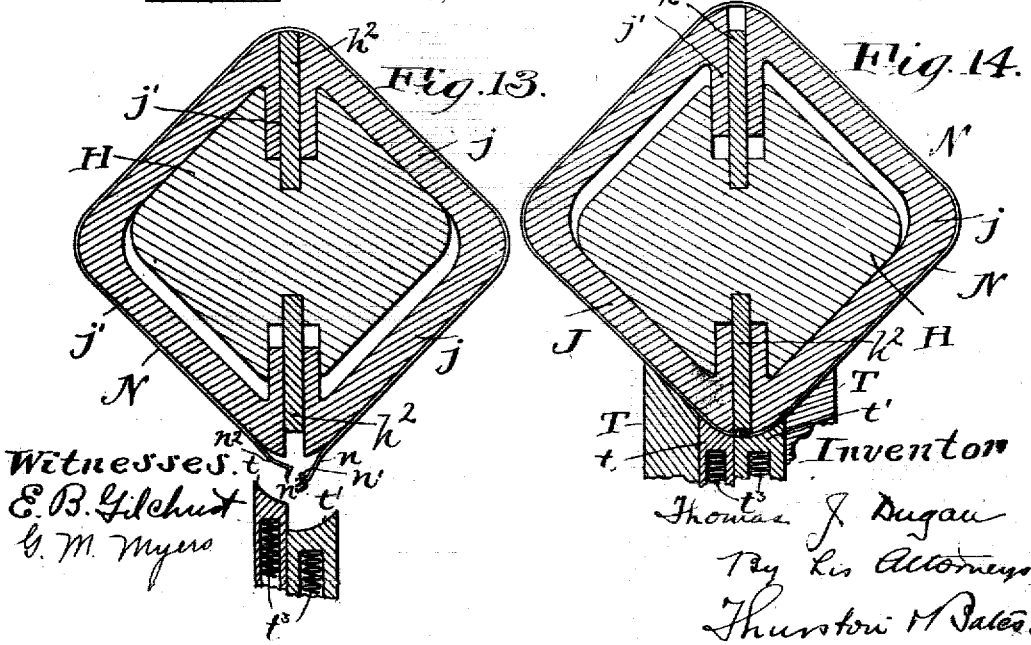

UNITED STATES PATENT OFFICE.

THOMAS J. DUGAN, OF CLEVELAND, OHIO, ASSIGNOR OF FIFTY-ONE ONE-HUNDREDTHS TO MARTIN J. O'DONNELL, OF CLEVELAND, OHIO.

MACHINE FOR MAKING CAN-BODIES.

No. 828,723.   Specification of Letters Patent.   Patented Aug. 14, 1906.

Application filed June 28, 1905. Serial No. 267,351.

*To all whom it may concern:*

Be it known that I, THOMAS J. DUGAN, a citizen of the United States, residing at Cleveland, in the county of Cuyahoga and State of Ohio, have invented a certain new and useful Improvement in Machines for Making Can-Bodies, of which the following is a full, clear, and exact description, reference being had to the accompanying drawings.

The object of my invention is to automatically make can-bodies, and particularly can-bodies which are flanged and beaded and have flat sides and rounded corners and have the seam in one of the corners.

The invention includes the mechanism for feeding the metal-stock sheets into the machine, the mechanism for cutting and forming the blanks, the mechanism for bending the blanks into shape and interlocking their ends and pressing the interlocking edges together to form the seam, the mechanism for automatically discharging the finished bodies, and to various other subordinate mechanisms which coöperate with the mechanisms above referred to to render the machine automatic and efficient, whereby said can-bodies may be produced rapidly and cheaply.

Although one of the main objects aimed at in designing the machine has been to produce substantially square can-bodies with rounded corners, the machine is adapted for making can-bodies of other shapes, depending, primarily, upon the shape of the form which the machine contains and over which the blanks are bent to form the bodies.

The invention may be said to consist in the construction and combination of parts shown in the drawings and hereinafter described, as pointed out in the claims.

Figure 2:
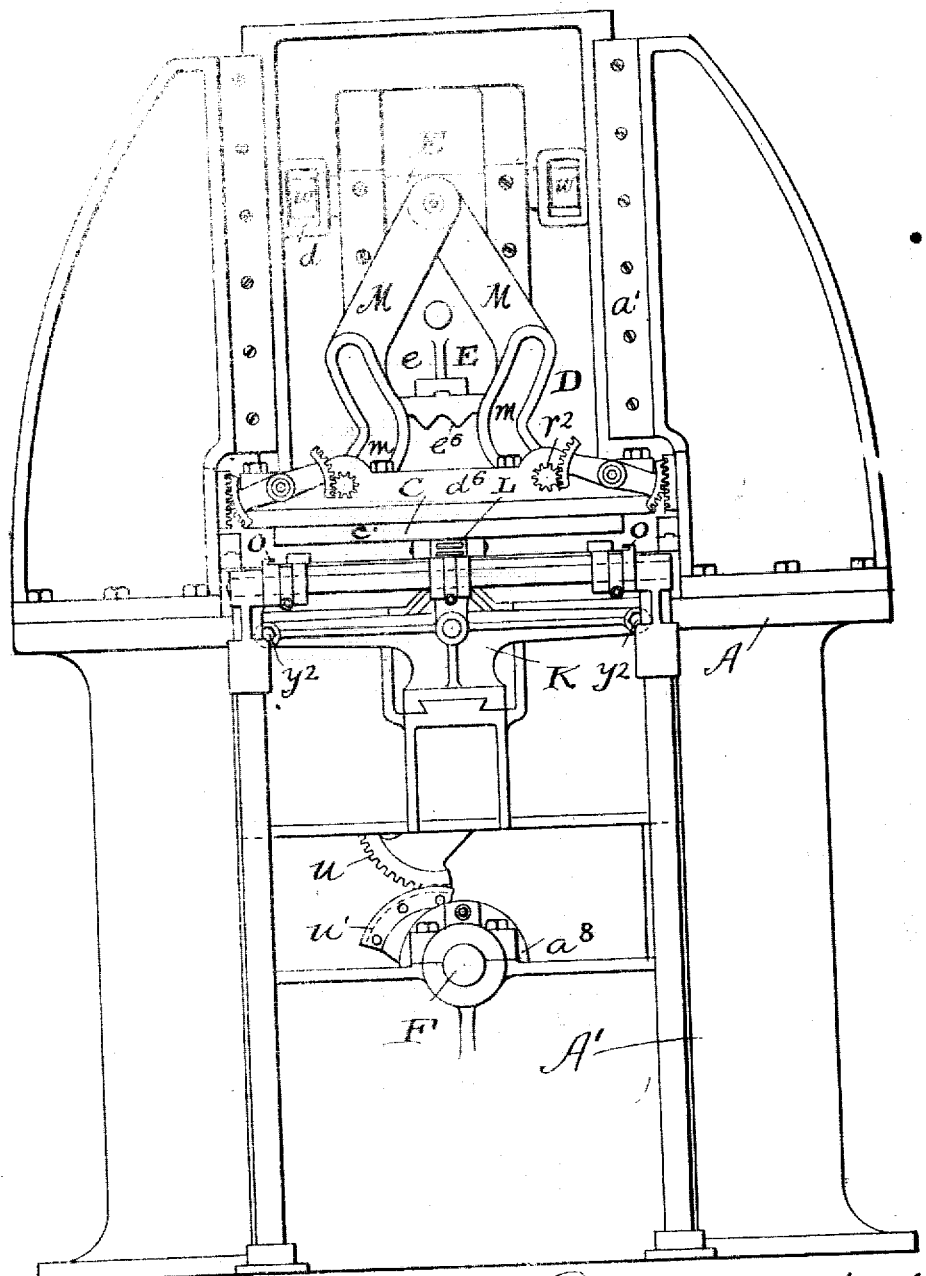
Figure 3:
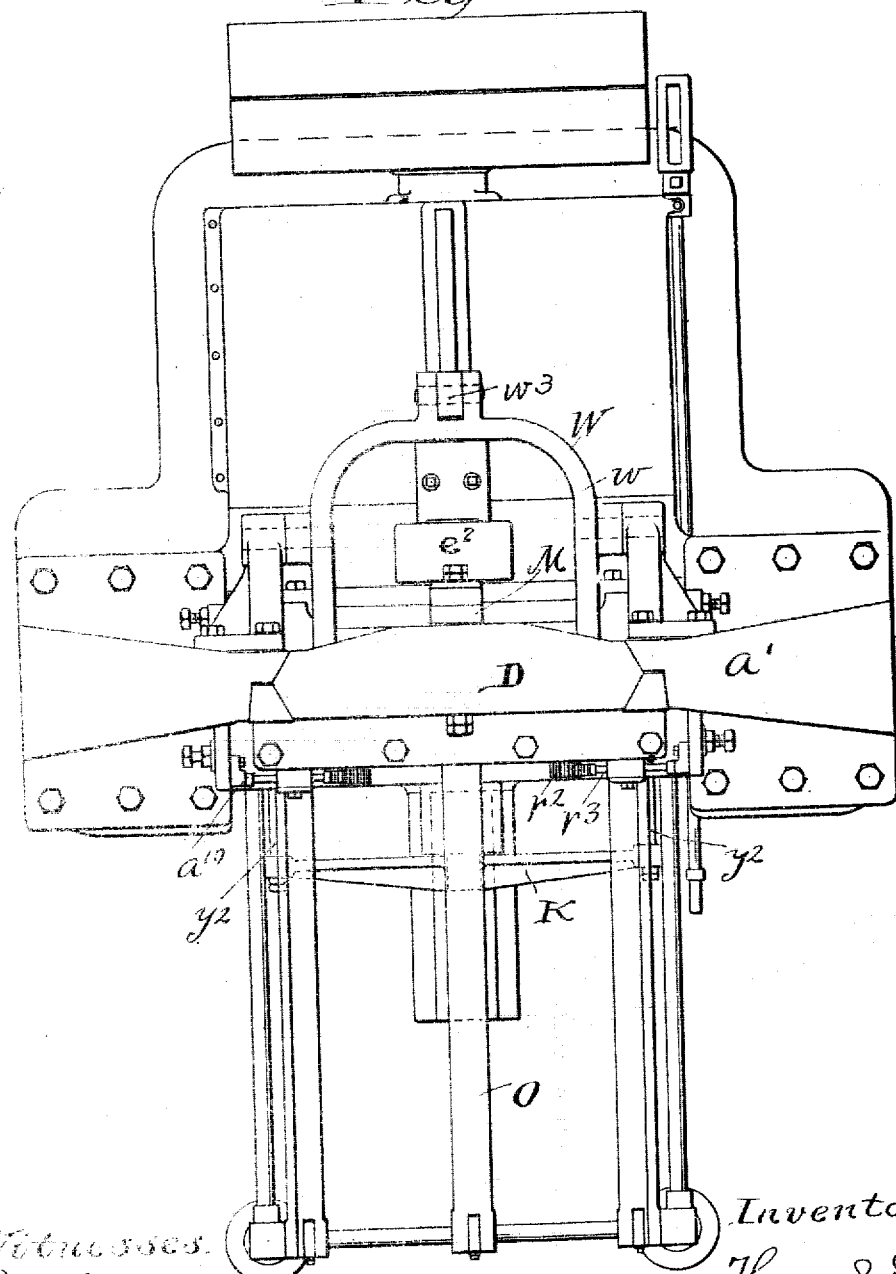
Figure 4:
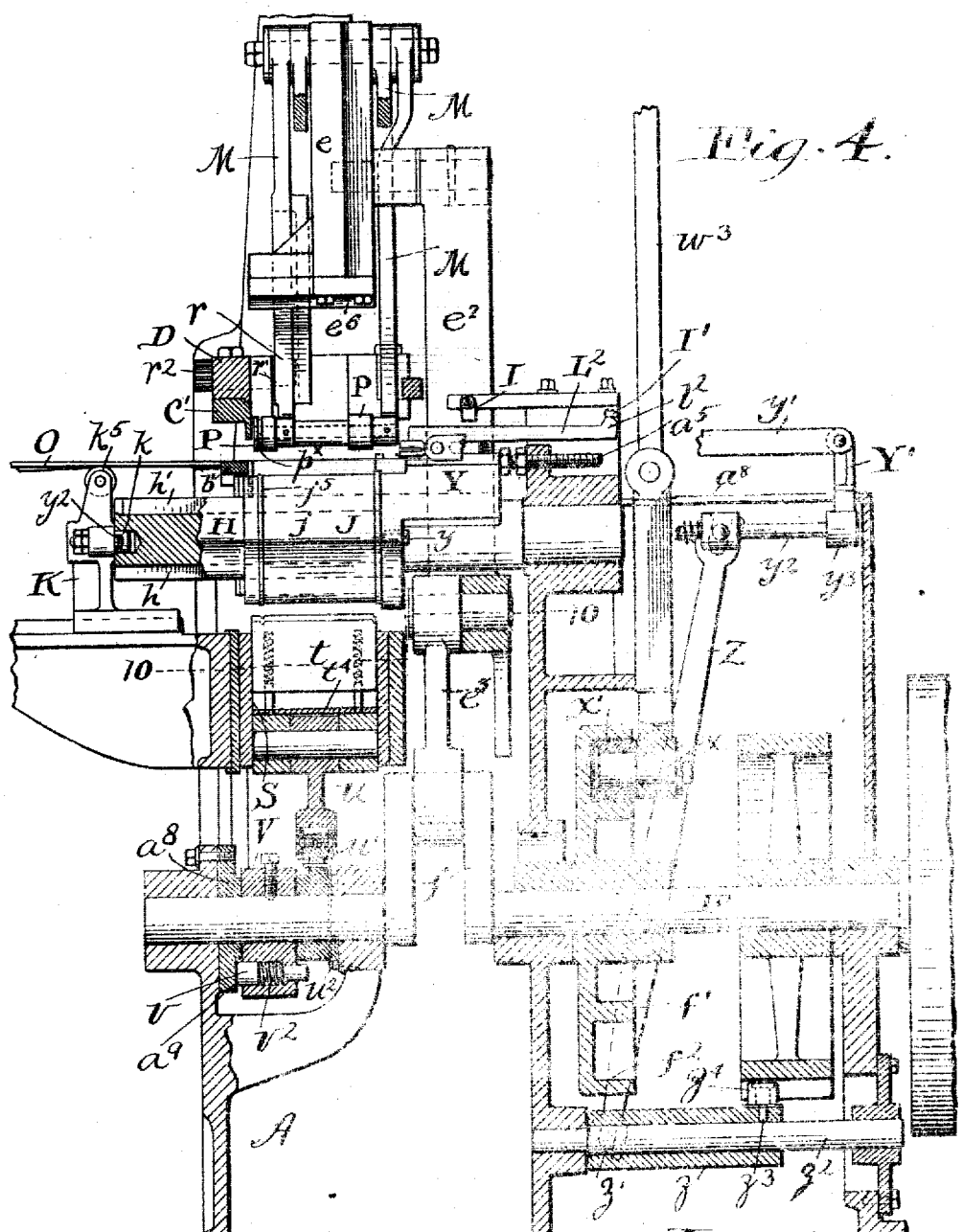
Figure 5:
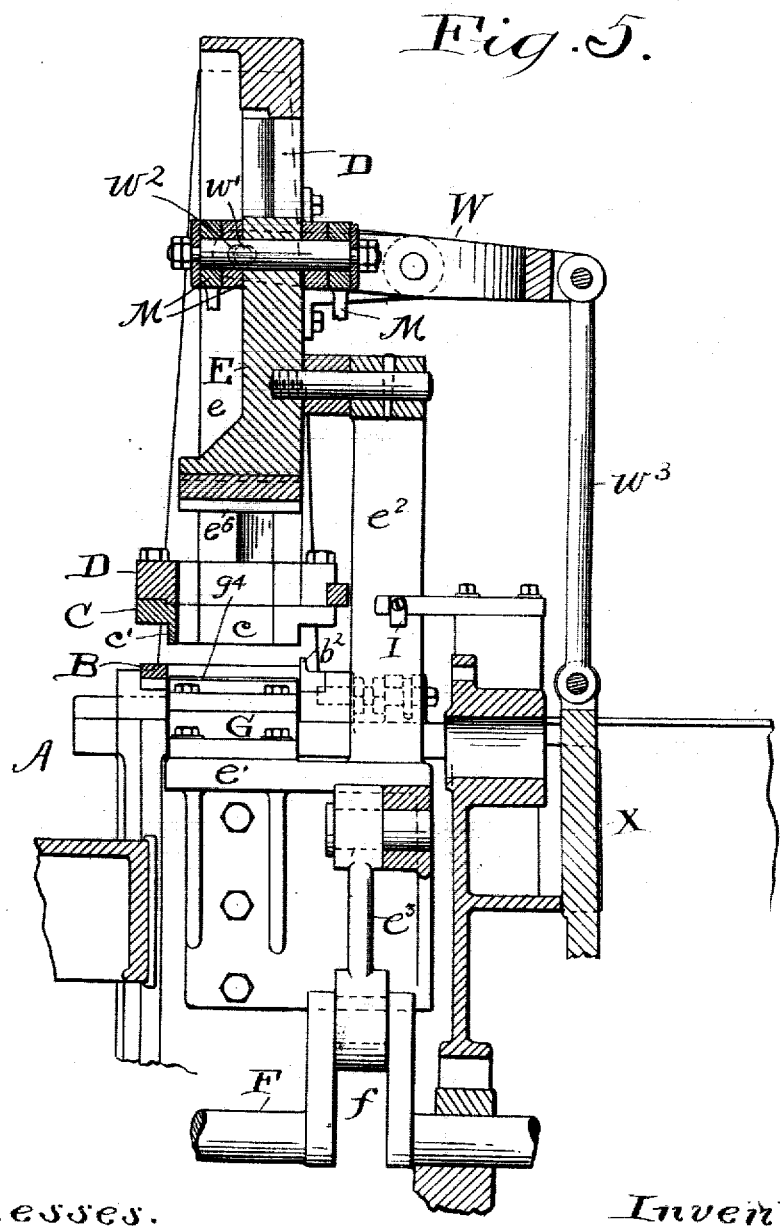
Figure 9:
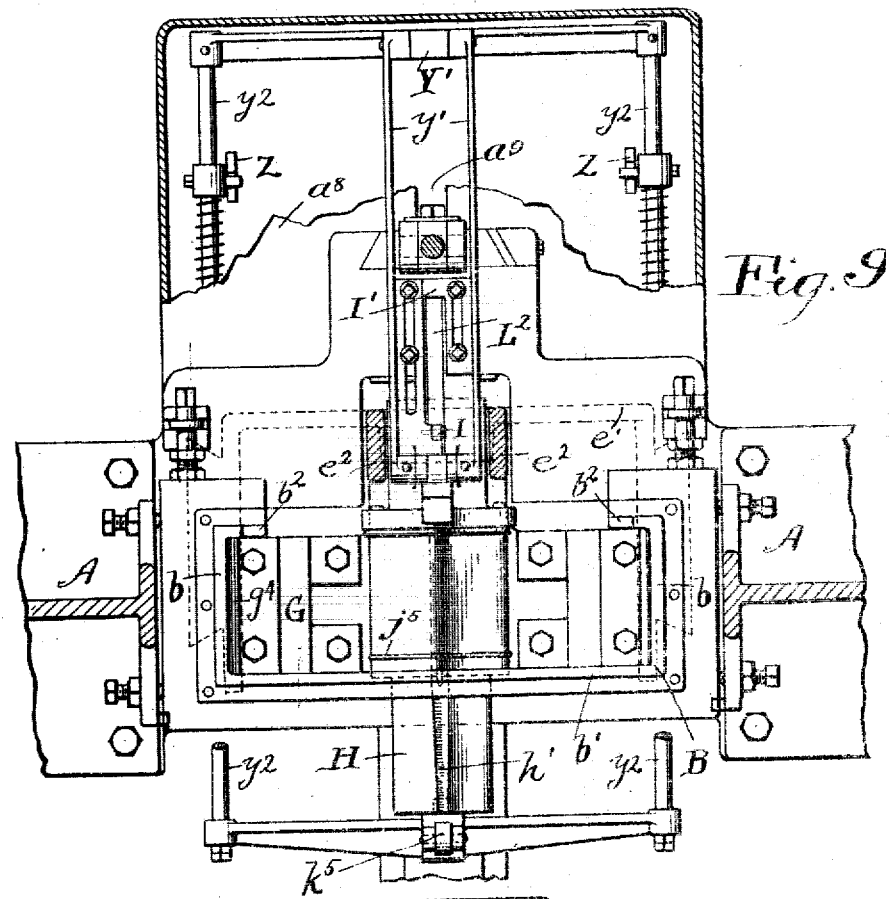
Figure 10:
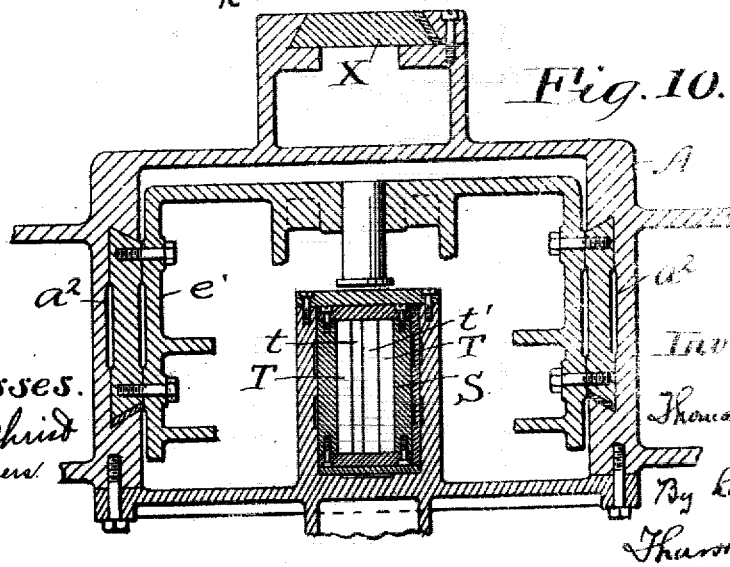
Figure 15:
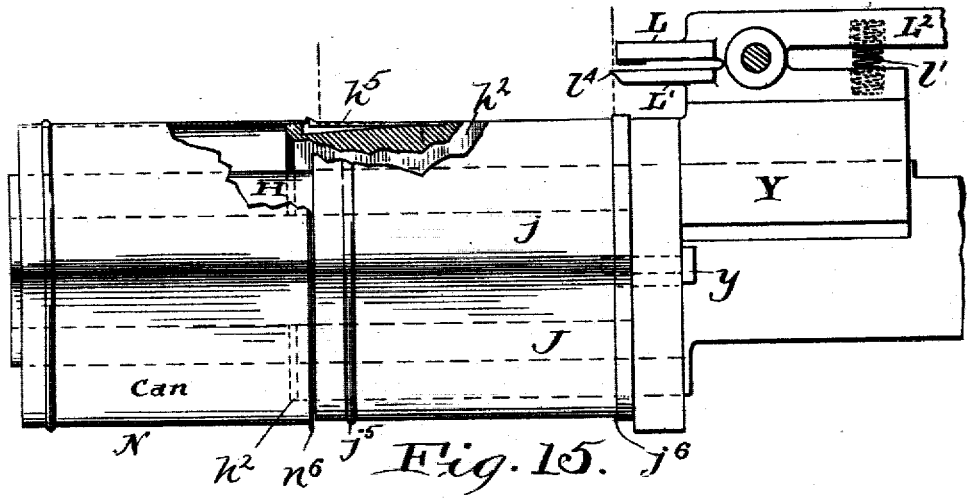
Figure 16:
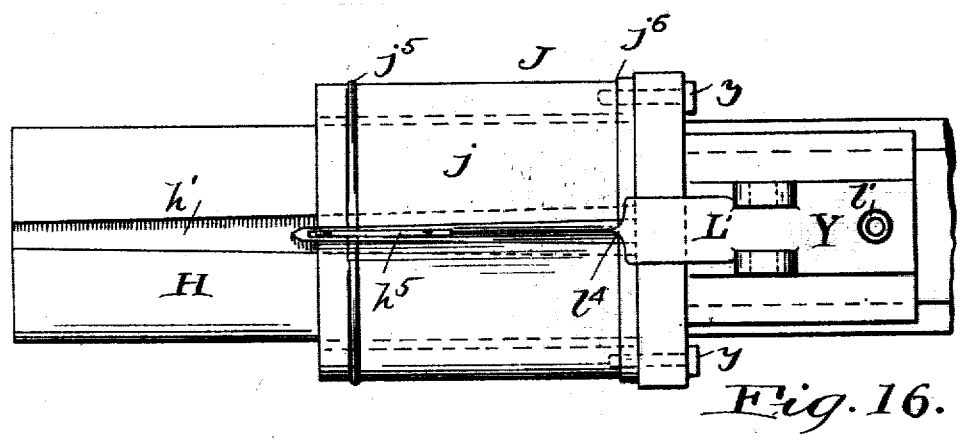
Figure 17:
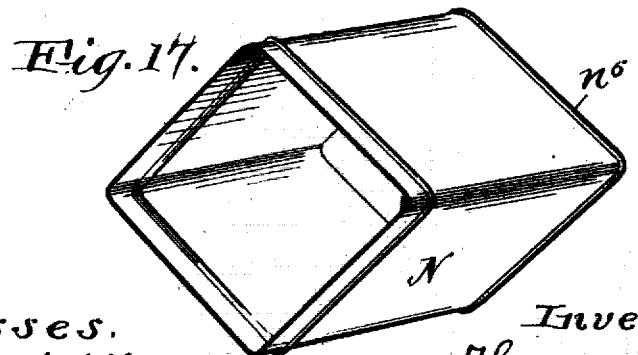

In the drawings, Figure 1 is a side elevation of a machine embodying this invention. Fig. 2 is a front view of said machine. Fig. 3 is a plan view thereof. Fig. 4 is a side elevation, partly in central section, of a certain part of the machine. Fig. 5 is a central sectional side view of the upper part of the machine with the form removed, said view being not much different from Fig. 4. Fig. 6 is a front view of the upper part of the machine and a vertical sectional view of some of the lower mechanisms. Fig. 7 is an enlarged front view of some of the same upper mechanism shown in Fig. 6. Fig. 8 is a sectional plan view in the plane indicated by lines 8 8 of Fig. 7. Fig. 9 is a plan view of the bed-plate of the machine and the parts which will appear when the upper part of the frame and the parts carried thereby are moved. Fig. 10 is a sectional plan view in the plane indicated by lines 10 10 of Fig. 4. Fig. 11 is an enlarged sectional front view of the dies which cut and shape the blank, the parts being shown in the position they occupy after the blank has been cut. Fig. 12 is a view of the same parts after the edges of the blank have been bent by said dies. Fig. 13 is a transverse vertical sectional view of the liner-covered horn, showing the position the parts occupy after the blank has been bent around the same, but before the edges of the blank have been locked together. Fig. 14 is a view of the same parts, showing their position just as the seam of the can-body has been finished. Fig. 15 is a side elevation of the horn and some associated parts. Fig. 16 is a plan view of the same, and Fig. 17 is a perspective view of a finished can-body.

In the bed-plate A of the machine is an opening large enough for the passage of the blank N, from which the can-body is to be made. Secured upon the bed-plate slightly overhanging this opening is a lower fixed die B, by which the blank is cut from the stock-sheet. This die is a substantially rectangular open frame, having a front member $b'$ and two sides $b$, but no rear member. The stock-sheet is drawn into the front of the machine over this die B, by means which will be presently explained, until the advancing edge of said stock-sheet comes against the stop-lugs $b^2$. The blank is cut from the stock-sheet between the fixed die B and the movable die C, which is on the lower end of a slide D. This slide is vertically movable in guideways in the upright frame members $a'$. The die C is rectangular and fits into the die B and is like it in that it has a front member $c'$ and two sides $c\ c$, but no rear member. There is another vertically-movable slide E, composed of a member $e$, a member $e'$, and a member $e^2$, which connects the rear parts of the members $e$ and $e'$, so that all parts must move together. The slide member $e$ is movable in guides in the slide D, which are of course above the level of the bed-plate A, while the slide member $e'$ is movable in guides $a^2$ on the inner faces of the two side frame members $a'$ below said bed-plate. Said slide E is moved up and down by means of a connecting-rod $e^3$, mounted upon a crank $f$, carried by the main driving-shaft F.

Upon the upper edges of the lower slide member $e'$ the lower bending-dies G are secured. These dies are bars which are located directly beneath the side members $c$ of the blank after it has been cut from the stock-sheet. The object of the coöperative action of the bending-dies is to bend one edge of the blank upward at an inclination, as at $n$, and to bend downward into vertical position the extreme edge $n'$ of this upwardly-bent portion and to bend the other edge of the blank correspondingly, but in the reverse direction—that is to say, to bend the blank downward at an inclination near its edge, as at $n^2$, and to bend the extreme edge $n^3$ upward into vertical position. It is evident that when the bends at $n$ and $n^2$ are straightened out the two edges $n'$ and $n^3$ will not be at right angles to the body of the blank, but will make acute angles thereto, wherefore they may be easily interlocked when brought together. In the lower edge of one of the side members $c$ of the cutting-die C is a shallow ratchet-shaped groove $c^2$. Upon the top face of the corresponding bending-die G is an upwardly-extended complementarily-shaped rib $g$. At the other side of the opening of the bed-plate a similar groove and rib are formed; but in this case the groove $g'$ is in the top face of the bending-die G, while the ratchet-shaped rib $c^3$ is in the lower face of the cutting-die. When the cutting-die in descending cuts the blank, it forces it down through the fixed die B and against the bending-dies G, whereby the edges thereof are bent, as heretofore explained and as shown in Fig. 12.

In that bending-die G (on the left side of Figs. 11 and 12) which has the ratchet-shaped recess there is a bar $g^4$, extending from one end of said die to the other and set into a recess $g^5$. Springs $g^6$ in said recess beneath said bar act to force this bar upward, so that normally it stands in the position shown in Fig. 11. The springs holding it up are strong enough to resist the downward movement of said bar until after the descending die on that side of the machine has bent the edge of the blank at $n^2$ downward over the inclined top edge of this bar. The further downward movement of the die C pushes this bar down, so that its top edge and one wall of its recess form the ratchet-shaped groove referred to, and in so doing bends the extreme edge $n^3$ of the blank upward in the vertical position, as before described. The upward projection of this bar $g^4$, whose top face forms the bottom of the ratchet-shaped groove when the bar is pressed down, causes the blank to be first bent along the line $n^2$.

This of course withdraws the adjacent edge of the blank from the side of the fixed cutting-die and permits it to be bent upward when the bar is pushed down. If the edge of the blank were not so drawn inward by bending the blank, the edge of the blank would not infrequently be rolled in upon itself instead of being bent upward in a vertical plane.

The blank having been cut and its edges having been bent as described, said blank is now ready to be bent around a form and the bent edges $n'$ $n^3$ interlocked and subsequently pressed together to form the can-body. The form shown is a horn H, whose rear end is rigidly secured to the frame and the liners J J, which embrace it. It projects forward in the openings in the dies and bed-plate, and its front end is normally supported by means of a pin $k$, attached to a slide K, which pin enters a central recess in the end of the horn. Upon this horn are movable liners J J about half as long as the horn. The horn itself, as shown, is nearly square in cross-section, being slightly round at the corners, and it is placed with said corners at the top, bottom, and sides thereof. In the upper and lower corners, respectively, are the longitudinal tapered grooves $h$ $h'$, which decrease in width gradually from the rear to the front end of said horn. Secured centrally in the bottom of these grooves and projecting out therefrom are longitudinally-extended tongues $h^2$, which are correspondingly tapered, being widest at their rear ends. The result is that on each side of each of these tongues (which, by the way, are only a little longer than the liners) is a groove of equal width from end to end; but said grooves draw together from the rear to the front ends of the horn. Each liner consists of two side members $j$ $j$, integral with each other and joined by rounded corners and lying at right angles to each other. On each free edge is an inwardly-extended tongue $j'$, which tongues are inclined slightly from end to end of the liners, so that they fit into the grooves in the horn $h$ $h'$, before explained, on opposite sides of the tongues $h^2$, and the edges of the liners are in contact with the sides of said tongues. These liners are placed upon the horn from the front free end thereof. When they are pushed toward the rear end of the horn, with their tongues $j'$ running in said grooves, they are expanded so that their inside dimensions become larger than the external dimensions of the horn, as shown in Figs. 13 and 14.

The tongues $h^2$ project out from the horn such distances that when the liners are expanded the outer edge of one tongue $h^2$ may be flush with and form a continuation of the surface of the liners and be a part of the form. At this time the other tongue $h^2$ does not come out quite as far as the surface of said liners on the opposite side of the form. This leaves a longitudinal groove between the liners on the lower side of the form, in which the seam of the can-body is formed.

The liner-covered horn constitutes a form, around which the blank is bent in forming the can-body. In many of the claims it is referred to as a "form," and it is to be understood that this word is not intended to indicate the specific form shown, but any form adapted for coöperation with the other parts specified in said claims.

The rear ends of the liners are loosely secured to a slide Y upon the horn. When the liners are in their normal positions at the rear end of the horn, this slide engages an adjustable set-screw $a^5$, carried by the frame. The liners are in the last-described position upon the horn when the blank N is bent around the liner-covered horn. The blank N after it has been cut and bent as described is bent around the liner-covered horn by the pressure from rollers P, mounted in the lower ends of arms M, whose upper ends are pivoted to the slide member $e$. In the arms M are guide-slots $m$, which are bent reversely to the corresponding sides of the form—i. e., the liner-covered horn. Projecting into these slots are friction-rollers $r$, which are mounted upon pins $r'$, (shown in Fig. 7 and shown by dotted lines in Figs. 4 and 8,) which pins are immovable during the downward movement of the slide E. When the slide E begins its downward movement, the bending-dies G G, carried by the lower slide member $e'$, move away from the edges of the blank, thereby freeing it. The rollers P then press the blank down upon the form and bend it around the same. The arms M move apart and then together during the downward movement of the slide, this movement being due to the guide-slots $m$ and pins $r$, so that the rollers P will follow the surface of said form. When the rollers P have carried the blank as far around as practical, which is substantially to the position shown in Fig. 13, a forming-die $e^6$, secured to the lower end of the upper member $e$ of the slide E, engages with the top of the blank N, thereby pressing it with great force down upon the form, thereby finishing a part of the can-body which the rollers P did not touch. During these movements the liners have been moved down upon the horn until they occupy the position relative thereto substantially as is shown in Fig. 13. At this time it will be seen there is a groove between the lower meeting edges of the two liners, the bottom of this groove being formed by the lower face of the lower tongues $h^3$.

Below the form there is a slide S, carrying the seam-forming die T and hammers $t\ t'$. These hammers are slidable upon each other in a vertical groove in the die and are normally pushed up in the die by springs $t^3$, so that they project unequally above the same. When the slide S is moved upward, the hammer $t$, first comes into engagement with one of the edges $n^3$ of the bent blank. This is the edge which is to go inside the other edge, and the hammer $t$ pushes the blank firmly against the surface of the liner, thereby straightening out the bend $n^2$ and carrying the bent edge $n^3$ into the groove between the lower edges of the liners. The further upward movement of the slide carries the other hammer $t'$ up, so that it engages with the other edge of the blank and presses it in upon the liner-covered horn, thereby straightening the bend $n$ and lapping the bent edge $n'$ over bent edge $n^3$. The upward movement of slide S causes the hammers $t\ t'$ to recede into the die until the lower ends of the hammers $t\ t'$ strike shoulders $t^4$ in the die, which prevents further relative movement of the hammers. While the hammers are being pressed upward they push the liners up on the horn, the slide member $e$ having in the meantime begun its upward movement, carrying die $e^6$ upward with it. In the final upward movement of slide S the hammer $t'$ presses the bent and overlapped edges of the blank between itself and the lower tongue $h^2$, thus completing the seam which unites the edges of the blank to form the can-body.

It will be seen that the described construction permits the formation of a substantially square can-body with the seam in one of the rounded corners thereof. Of course it is the shape of the liner-covered horn or form which determines the shape of the can-body, and therefore can-bodies of various shapes may be made by employing forms having the required external configuration. If it is desired that the body shall be beaded, a circumferential rib $j^5$ is formed upon the liners and tongues $h^2$ and corresponding grooves $p$ are formed in the bending-rolls P and in the face of the die T and hammers $t\ t'$ and die $e^6$. It is not necessary in the construction of the can-bodies that these bending-rolls P shall traverse the entire surface of the blank. It is only necessary that they shall engage with said blank near its front and rear ends, for if the ends are drawn in upon the liners the intermediate portions will follow. It is for this reason that the rollers may be constructed in the manner shown—that is to say, a shaft may be mounted in the ends of the arms M and a collar may be secured on this shaft between said rollers.

The slide S is given its upward-and-downward movement at the proper time by an unusual sort of toggle. One of the toggle-arms $u$ is pivoted to the slide S, and one, $u'$, is loosely hung on the driving-shaft. These toggle-arms are in the form of gear-segments which mesh, as shown. A spring $u^3$ acts to rock link $u'$, which causes the toggle to bend to the position shown in Fig. 6. To rock them in the contrary direction to cause the upward movement of said slide, there is a disk V, secured to the shaft and carrying a pin $v$. This pin is parallel with the shaft and projects from both faces of the disk. On the inside of frame A is fastened a disk $a^8$, with a cam-surface $a^9$, against which the spring $v^2$ presses the pin $v$. In a certain part of the revolution of the shaft this cam pushes the pin through the disk sufficiently far to cause its other end $v$ to engage with the edge of the toggle-link $u'$, and thereby rock it in that direction which will cause the upward movement of the slide. When the slide has moved up far enough, the cam-surface $a^9$ suddenly falls away and the spring $v^2$ withdraws the pin $v$ from engagement with said toggle member.

It is of course desirable that there shall be an outwardly-turned flange on the lower end of the can-body. This flange $n^6$ is formed thereon while the blank is being bent around the horn, because that edge of the blank overhangs an annular shoulder $j^6$ on the liners, and the forming-rollers P when they press the blank upon the liners will form the flange on the blank between this flange on the liners and the ends of the rollers.

All of the moving parts receive their motion from a single driving-shaft, wherefore their movements can be properly timed. The slide D is moved up and down by a lever W, which is pivoted to the frame of the machine and has two forwardly-projecting fork-arms $w$. Pins $w'$, secured to the slide, enter slots $w^2$ in said fork-arms. The rear end of this lever is connected by a connecting-rod $w^3$ with a vertical movable slide X, moving in suitable guideways in the frame. On the end of this slide is a pin $x$, on which is a friction-roller $x'$. This roller enters a cam-groove $f^2$ in one face of a disk $f'$, secured to the main driving-shaft F.

As above stated, the two liners are attached to a slide Y, embracing the horn. The attachment is by means of bolts $y$, which pass loosely through slots in a flange on this slide and screw into the ends of the liners. The loose fit of these bolts in the holes permits the liners to have the movement toward and from the axis of the horn which has been referred to. This slide Y is connected, by means of a link $y'$, with another slide Y', which rests upon a horizontal member $a^8$ of the machine-frame. A part of this slide passes down through a slot $a^9$ in said horizontal member, and thereby the slide is guided. The part of the slide below the horizontal member is connected by two rods $y^2$ $y^2$ with the slide K, before referred to. These two rods are connected by a transverse rod $y^3$ extending between them. A lever Z is pivoted to the frame of the machine, and its forked upper end engages with said rod $y^2$. Its lower end is likewise forked and engages with a pin $z'$, projecting laterally from a sleeve $z$, which slides but does not turn upon a fixed rod $z^2$. On another pin $z^3$, projecting from this sleeve, is a friction-roller $z^4$, which is engaged by a cam upon the driving-shaft, whereby this sleeve moves endwise. As soon as the can-body is formed the slide Y is moved toward the front end of the horn by the described mechanism. It pushes the liners, on which is the finished can-body, along on the horn. Because of the convergence of the slots on which the liner-tongues are fitted the liners are drawn inward and are thereby contracted, so that the can-body may be removed. When the liners have reached the limit of their forward movement, the bottom end of the can-body will pass a spring-pawl $h^5$, let into the surface of the upper tongue $h^2$, which the horn carries, and the end of that pawl will spring up behind the bottom edge of the can-body, so that when the liners are moved backward, as they are immediately after this, the can-body does not accompany them. This can-body when the liners are back to their normal position drops down on the horn and is removed therefrom by the next forward movement of the liners. On this slide Y are gripper-jaws L L' for taking hold of the stock-sheet to draw it into the machine. The lower gripper-jaw L' is fixed; but the upper jaw is pivoted and has a long rearwardly-extended arm $L^2$. A spring $l'$ operates to close these jaws. The stock-sheet lies upon a plate or table O, which is pivoted on its front end on a transverse horizontal pivot. Its rear end is supported partly by resting on the front edge of the fixed die B and partly by resting upon a roller $k^5$, mounted on the slide K. On the under side of this table is an inclined surface O', with which this roller engages. When the slide moves forward to disengage the front end of the horn and to allow one of the can-bodies to be pushed therefrom, this movement is accompanied, as before explained, by the forward movement of the slide Y, which carries the gripper-jaws. The slide K in its forward movement lifts the rear end of the table O, on which the stock-sheet rests, so that the lower gripper-jaw when it reaches the edge of said stock-sheet may pass under it. At this time the upper gripper-jaw has been opened by the engagement of the upturned beveled rear end $l^2$ of said gripper-jaw with a pawl I, hanging down in its path from a fixed part of the machine. This pawl is not capable of being swung forward beyond a vertical position, (shown in Fig. 5,) and so when the rear end of the gripper-jaw reaches and engages with it the jaw is opened. As the gripper-jaw moves still farther forward its end passes this pawl, and the spring closes the gripper-jaw upon the stock-sheet. When the slides begin their rearward movement, the rear end of the movable gripper-jaw strikes this pawl and swings it rearward as it passes, so that the gripper-jaw is not opened; but when the slides reach the end of their rearward movement this upturned end of the gripper-jaw engages with a fixed block I', thereby causing the jaw to open. The grippers continue their rearward movement a little after this time until the edge of the stock-sheet is barely supported by a little forwardly-projected tongue $l^4$ on the fixed gripper-jaw L'. The stock-sheet is now in position to have a blank cut therefrom by the descending die C.

It is desirable that the finished can-body shall be removed while the slide E is moving upward; but this would not be possible if during the upward movement of the slide the rollers were bearing upon the surface of said can-body. In order to draw these rollers away from the can-body and out of contact therewith before the mechanism begins to remove said can-body, the friction-rollers $r$ are mounted on eccentric-pins on the ends of the shafts R, which shafts are mounted in a cross-bar $d^6$, secured to slide D. Each of these shafts carries a small pinion $r^2$. A rocker $r^3$ is associated with each of these pinions $r^2$ and is pivoted to the same cross-bar $d^6$ and has at one end a gear-segment which engages with the corresponding pinion $r^2$, and another gear-segment on the other end which engages with a fixed rack $a^{10}$. When the slide D moves up, these rockers are caused to rock and they turn the shaft R, whereby through the eccentric-pins and rollers thereon both set of arms M are drawn outward, so that the rollers P they carry do not touch the can-body. During the subsequent downward movement of the slide D, which results in cutting off the blank, the position of these rockers is reversed, so that said arms are swung inward to a position where when they move downward with slide E they will bend the blank down upon the liner-covered horn.

So far as I am aware no prior machine for forming can-bodies has been capable of beading the body while it is being formed. The difficulty has not been so much in making the bead as in removing a beaded can-body from the form on which the body is made. Because the liners contract as they are moved toward the end of the horn the removal of the finished and beaded bodies presents no difficulties in the machine hereinbefore described. I am further of the opinion that this machine is the first which is capable of putting the bottom flange on the can-body while the body is being made, and I also believe that this is the first machine which automatically draws the stock sheet into the machine and cuts blanks therefrom and presents said blanks to the action of the bending and forming mechanism.

Particular attention is called to the simplicity of the dies and the movements of the dies which form the "lock" on the edges of the blank—viz., the edges $n'$ and $n^3$—which just before they are interlocked must be at acute angles to the other part of the blank. These edges are so bent in the machine above described by dies which move in one direction only—viz., in straight vertical paths.

The use of reference-letters in the claims is not with the intention of limiting the scope of said claims to specific constructions, but merely for convenience in enabling the reader to locate the parts of the machine referred to.

Having described my invention, I claim—

1. In a machine for making can-bodies, a form, comprising a horn H, and liners J J embracing the horn and longitudinally movable thereon, and means which cause said liners to draw together upon said horn as they are moving toward the front end thereof.

2. In a machine for making can-bodies, a form, comprising a horn H, having tapered longitudinal tongues $h^2$ and liners J J which embrace the horn and are longitudinally movable thereon and engage at their edges with said tongues, and means for preserving such engagement as the liners move longitudinally on said horn.

3. In a machine for making can-bodies, a form comprising a horn H having tapered longitudinal grooves, and tapered longitudinal tongues secured centrally in said grooves, and a pair of liners which are longitudinally movable upon said horn, with their edges in contact with said tongues and have inwardly-directed tongues which are slidably fitted in said grooves.

4. In a machine for making can-bodies, a form comprising a horizontal horn which, in cross-section, is substantially square with rounded corners, said horn being supported from one end with said corners at the sides and at the top and bottom, and there being in the top and bottom corners longitudinal tapered grooves and longitudinal tapered tongues projecting centrally from said grooves, and a pair of angular liners embracing the sides of said horn and having rounded corners and having also, at their edges, inwardly-directed tongues which are slidably fitted in said grooves on opposite sides of the tongues therein.

5. In a machine for making can-bodies, a form having four sides lying at right angles to each other and joined by rounded corners, and a longitudinal groove in one of said rounded corners.

6. In a machine for making can-bodies, a horizontal form supported from one end and having plain sides and rounded corners, of which one of the corners is the lowest part of said form and is provided with a longitudinal groove, with a vertically-movable member, forming arms pivoted thereto, guides for said arms, a die for pressing the top of a blank down upon the form, and means which cause the edges of the blank to interlock and to be pressed together in said groove to form the seam.

7. In a machine for making can-bodies, a horizontal form, supported from one end and having plain sides and rounded corners, of which one of the corners is the lowest part of said form and is provided with a longitudinal groove, with a vertically-movable member, forming arms pivoted thereto, guides for said arms, a die for pressing the top of a blank down upon the form, a vertically-movable member, two hammers mounted therein and springs which yieldingly press said hammers upward so that normally one projects above the other.

8. In a machine for making can-bodies, a horizontal form, supported from one end and having plain sides and rounded corners, of which one of the corners is the lowest part of said form and is provided with a longitudinal groove, with a vertically-movable member, forming arms pivoted thereto, guides for said arms, a die for pressing the top of a blank down upon the form, a vertically-movable member, two hammers mounted therein and springs, which yieldingly press said hammers upward so that normally one projects above the other, and shoulders in said movable member for limiting the relative downward movement of said hammers therein.

9. In a machine for forming can-bodies, the combination of a fixed cutting-die, a movable cutting-die, a slide movable horizontally between said dies, and grippers carried by said slide to grasp the edge of a stock sheet and draw it between said dies.

10. In a machine for making can-bodies, the combination of a three-sided fixed cutting-die, a three-sided movable cutting-die, grippers movable between said dies for drawing the stock sheet between them, and stop-lugs adjacent to the open sides of said dies to limit the inward movement of said stock sheets.

11. In a machine for forming can-bodies, the combination of a fixed cutting-die having a front and two side members but no rear member, a fixed horn projecting into the space within said die, a vertically-movable cutting-die having a front and two side members but no rear member, and means whereby the blank cut from the stock sheet by said dies, will be wrapped about the horn and the meeting edges will be caused to interlock and be pressed together to form a seam.

12. In a machine for making can-bodies, the combination of a vertical reciprocating slide and a cutting and bending die secured to its lower end, a fixed cutting-die, a second vertical movable slide, bending-dies secured to the latter slide just below the slide members of the bending and cutting die, and mechanism for moving said slides independently.

13. In a machine for forming can-bodies, the combination of a fixed cutting-die, a movable cutting-die, mechanism for drawing the stock sheet between said dies, a form located in the opening through the fixed cutting-die, and mechanism for bending the cut blank around said form.

14. In a machine for forming can-bodies, the combination of a fixed cutting-die, a movable cutting-die, having the bottom of its side members shaped to form bending-dies, two bending-die bars located beneath said side members and having complementarily-shaped faces, a movable slide to which said die-bars are secured, a form located centrally beneath the blank which said dies will cut from the stock sheet, and means for bending said blank around said form.

15. In a machine for forming can-bodies, the combination of a bed-plate having an opening, a vertically-movable slide having one part below said bed-plate, bending-die bars secured upon said slide and located within the opening in the bed-plate at the sides thereof, a form fixed centrally in said opening, a second vertically-movable slide having on its lower end two dies which are vertically above said die-bars and are respectively adapted to engage with the edges of a blank in said opening, arms pivoted to the first-mentioned slide above the bed-plate, guides engaging with said arms to cause them to follow the contour of said form while they are being moved downward, and mechanism for independently moving said two slides.

16. In a machine for forming can-bodies, the combination of a bed-plate having an opening, a form secured in said opening, a pair of bending-die bars movable in said opening, and a movable support therefor with a pair of opposed bending-dies, a movable slide to which they are secured, said bending-dies being formed on their meeting faces substantially as described, whereby they will bend the blank upward at an inclination near one edge and will bend the extreme edge downward into vertical position, and will bend the blank downward at an inclination near the other edge and will bend the extreme edge upward into vertical position, means for independently moving said slide and support, and mechanism for bending the blank around said form and for interlocking and pressing together the bent edges of said blank.

17. In a machine for making can-bodies, the combination of a vertical reciprocating slide, and a cutting and bending die secured to its lower end, a fixed cutting-die, a second vertical movable slide, bending-dies secured to the latter slide just below the side members of the bending and cutting die, mechanism for moving said slides independently, a form, arms pivoted to the last-mentioned slide and having forming-rollers on their lower ends which arms have inclined slots in them, pins secured to the first-mentioned slide entering said slots, a slide below the horn, two independently-movable and interlocking seam-forming hammers carried by the latter slide, and mechanisms for moving said slides, substantially as described.

18. In a machine for forming can-bodies, the combination of a lower die having in the face of one side member a ratchet-shaped groove and in the face of the other side member a ratchet-shaped rib, and the upper die having a ratchet-shaped groove opposed to the ratchet-shaped tooth first mentioned and having a ratchet-shaped tooth opposed to the ratchet-shaped groove first mentioned.

19. In a machine for making can-bodies, the combination of a vertically-movable top die having on the lower face of one side member a ratchet-shaped groove, and having on the lower face of the other side member a ratchet-shaped tooth, with a pair of die-bars located beneath the two side members of the upper die, one of them having a ratchet-shaped tooth just below the ratchet-shaped groove in the upper die, and the other having a recess just below the ratchet-shaped tooth of the upper die, a bar slidably fitted in said recess and having an inclined top face, and springs which yieldingly force the bar upward whereby it normally projects above said bar.

20. In a machine for making can-bodies, the combination of bending-dies whose engaging faces are shaped to bend the blank at an inclination upward near one side and to bend the extreme edge of that side downward into a vertical position, and said die being also adapted to bend the other side of the die downward at an incline and to bend the edge of said side upward into a vertical position, with a horn, means for bending the blank around said horn, means for straightening out the inclined parts of said blank, and causing the said edges to interlock, and means for pressing said interlocked edges together to form a seam.

21. In a machine for making can-bodies, the combination of a horizontal form around which the blank is to be bent, with a vertically-movable member, a pair of forming-arms pivotally secured to said member and containing guide-slots, pins which enter said slots, and which are immovable during the downward movement of said movable member.

22. In a machine for making can-bodies, the combination of a form around which the blank is to be bent, a vertically-movable member, a pair of forming-arms pivotally secured to said member and containing guide-slots, two rock-shafts, crank-pins secured thereto and entering said slots respectively, and mechanism for turning said rock-shafts.

23. In a machine for making can-bodies, the combination of a horizontal form, a vertically-movable slide having a forming-die on its under side, a pair of forming-arms pivoted to said slide, and guides by means of which said arms, during the downward movement of the slide, are swung from and toward each other and their lower ends caused to follow the contour of said form.

24. In a machine for making can-bodies, the combination of a form, a vertically-movable slide having a forming-die in its under side, a pair of forming-arms pivoted to said slide, and guides by means of which said arms, during the downward movement of the slide, are swung from and toward each other, to cause their lower ends to follow the contour of said form, and means for causing the meeting edges of the blank to interlock, and for pressing the interlocked edges together to form a seam.

25. In a machine for making can-bodies, the combination of a horn H having tapered longitudinal grooves and tapered longitudinal tongues disposed centrally in said grooves, with a pair of liners J J longitudinally movable upon said horn, and having inwardly-directed tongues which are slidably fitted in said grooves on opposite sides of said tongues, means for bending the blank around said liner-covered horn, mechanism for interlocking and pressing together the edges of said blank to make a seam in one of the longitudinal recesses between proximate edges of the liners, and means for moving said liners toward and from the end of the horn.

26. In a machine for making can-bodies, the combination of a horn H having tapered longitudinal grooves and tapered longitudinal tongues disposed centrally in said grooves, with a pair of liners longitudinally movable upon said horn, and having inwardly-directed tongues which are slidably fitted in said grooves on opposite sides of said tongues, means for bending the blank around said liner-covered horn, mechanism for interlocking and pressing together the edges of said blank, means for moving said liners endwise upon said horn, and a spring-pawl adapted to engage the rear end of the can-body to prevent its backward movement when the liners are moved backward upon the horn.

27. In a machine for making can-bodies, the combination of a horn H having tapered longitudinal grooves and tapered longitudinal tongues disposed centrally in said grooves, with a pair of liners longitudinally movable upon said horn and having inwardly-directed tongues which are slidably fitted in said grooves on opposite sides of said tongues, means for bending the blank around said liner-covered horn, mechanism for interlocking and pressing together the edges of said blank, means for moving said liners endwise upon said horn, a vertically-movable member, a pair of arms pivoted thereto having forming-rollers mounted in their lower ends, which arms have crooked slots in them, pins which pass into said slots and are fixed during the downward movement of said slide.

28. In a machine for making can-bodies, the combination of a horn H having tapered longitudinal grooves and tapered longitudinal tongues disposed centrally in said grooves, with a pair of liners longitudinally movable upon said horn and having inwardly-directed tongues which are slidably fitted in said grooves on opposite sides of said tongues, means for bending the blank around said liner-covered horn, mechanism for interlocking and pressing together the edges of said blank, means for moving said liners endwise upon said horn, a vertically-movable slide, a pair of arms pivoted thereto (having forming-rollers mounted in their lower ends,) which arms have slots in them, a pair of rock-shafts, means for turning the same, and crank-pins secured to said rock-shafts and projecting into said slots.

29. In a machine for forming can-bodies, the combination of a horn, and two vertically-movable slides with two arms pivoted to one slide and having forming-rollers mounted in their lower ends, rock-shafts mounted in the other slide and having crank-pins projecting from their ends which respectively enter the slots in said arms, a pinion secured to said rock-shafts a pair of fixed racks, and a pair of rockers pivoted to the second slide, each rocker having at one end, a gear-segment engaging with one of the pinions referred to, and at the other end, a gear-segment engaging with said fixed rack, and means for moving said slides independently.

30. In a machine for making can-bodies, the combination of a form having a longitudinal groove in its lower face, means for wrapping around said form a blank whose edges are bent so as to be capable of interlocking, a vertically-movable slide below said form, two independent movable hammers carried by said slide adapted to cause the edges of the blank to interlock and to press said interlocked edges together in said longitudinal groove in the form.

31. In a machine for forming can-bodies, the combination of a form, means for wrapping the blank around the same and causing its edges to interlock, with a vertically-movable slide, carrying means for pressing the interlocked edges of the blank together to form a seam, a gear-segment pivoted to said slide, an intermeshing gear-segment pivoted below the slide, and means for periodically rocking the latter segment backward and forward.

32. In a machine for forming can-bodies, the combination of a form, means for wrapping the blank around the seam and causing its edges to interlock with a vertically-movable slide, carrying means for pressing the interlocked edges of the blank together to form a seam, a gear-segment pivoted to said slide, an intermeshing gear-segment mounted below the slide, a shaft upon which the latter segment is loosely mounted, a disk secured to said shaft, a latch carried thereby for engaging said gear-segments, means for moving said latch into and out of the path of said segment, and means for turning said gear-segment to its normal position.

33. In a machine for making can-bodies, the combination of a horn, means for wrapping the blank around the horn and causing its edges to interlock, with a vertically-movable slide, carrying means for pressing the interlocked edges of the blank together to form a seam, a gear-segment pivoted to said slide, an intermeshing gear-segment mounted below the slide, a shaft upon which the latter segment is loosely mounted, a disk secured to said shaft, a pin carried by said disk and projecting from both sides thereof, a fixed cam adjacent to the disk and a spring for causing the pin to engage said cam.

34. In a machine for making can-bodies, the combination of a horn H having tapered longitudinal grooves and tapered longitudinal tongues disposed centrally in said grooves, with a pair of liners longitudinally movable upon said horn, and having inwardly-directed tongues which are slidably fitted in said grooves on opposite sides of said tongues, means for bending the blank around said liner-covered horn, mechanism for interlocking and pressing together the edges of said blank, and means for moving said liners endwise upon said horn, a slide to which the rear ends of said liners are loosely connected, gripper-jaws secured to said slide, means for moving said slide forward and backward, means for opening and closing the gripper-jaws when the slide is near the front end of its path, and means for opening said gripper-jaws when they are near the rear end of their path.

35. In a machine for making can-bodies, the combination of a horn, liners embracing the same and longitudinally movable thereon, and means which cause said liners to contract upon said horn as they are moving toward the front end thereof, a slide to which said liners are attached, a slide connected with the first-named slide and adapted to normally engage with and support the front end of the horn.

36. In a machine for making can-bodies, the combination of a horn, liners embracing the same and longitudinally movable thereon, and means which cause said liners to draw together upon the horn as they are moving toward the front end thereof, said liners having a projecting bead annularly combined with a vertically-movable member, two forming-arms pivoted thereto, rollers mounted in the free ends of said arms and having annular grooves opposed to the beads of said liners, a die for pressing the blank down upon the liners, having a groove in its face opposed to the beads on the liners, and hammers below the horn having in their faces grooves which are opposed to said beads.

In testimony whereof I hereunto affix my signature in the presence of two witnesses.

THOMAS J. DUGAN.

Witnesses:
ALBERT H. BATES.
E. L. THURSTON.